United States Patent [19]

Aneja et al.

[11] 4,141,994

[45] Feb. 27, 1979

[54] METHOD FOR PIGMENTING FISH FLESH

[75] Inventors: Rajindra Aneja, St. Albans; Alan P. Davies, Hitchen, both of England; Maxwell C. Keith, Aberdeen, Scotland

[73] Assignee: Internationale Octooimaatschappij "Octropa" B.V., Rotterdam, Netherlands

[21] Appl. No.: 779,785

[22] Filed: Mar. 21, 1977

[30] Foreign Application Priority Data

Mar. 22, 1976 [GB] United Kingdom ............... 11478/76

[51] Int. Cl.² ............................................ A61K 31/12
[52] U.S. Cl. .................................. 424/331; 424/313; 426/540
[58] Field of Search .................. 426/540; 424/331, 313

[56] References Cited

U.S. PATENT DOCUMENTS

| 3,206,316 | 9/1915 | Kläui | 426/540 |
| 3,786,123 | 1/1974 | Katzen | 424/331 |

OTHER PUBLICATIONS

Chemical Abstracts, vol. 68 (1968), p. 1175/a.
Merck Index, 7th Ed. (1960), p. 109.

*Primary Examiner*—V. D. Turner
*Attorney, Agent, or Firm*—Barry Kramer

[57] ABSTRACT

Edible compositions suitable as foodstuff additives or diet supplements for humans and for animals comprising a diet supplementing agent, such as vitamins, vitamin precursors and coloring agents, and an acyl lactylate emulsifier in a weight ratio ranging from 100:1 to 1:100, said compositions having increased efficiency in uptake by a human or animal of the diet supplementing agent. A process for preparing said compositions and rearing of animals on a diet incorporating said edible compositions.

5 Claims, No Drawings

METHOD FOR PIGMENTING FISH FLESH

The present invention relates to edible compositions. More particularly the invention relates to edible compositions which can be suitably used as foodstuff additives or diet supplements for humans and for animals.

Diets, especially those of domesticated and industrially-reared animals, often need to be supplemented by the inclusion of minor ingredients such as vitamins, vitamin precursors and colouring agents. Such minor ingredients are ingested by the human or animal, and perform a useful function once ingested. The importance of vitamins and vitamin precursors is well known, but certain colouring agents are useful in animal diets in particular. Certain colouring agents can impart an appropriate colour to the flesh of the animal itself, for example the pink colouration of the flesh of anadromous fish such as salmon and sea trout, or to a product of the animal, for example the yellow colouration of the yolk of hens' eggs. For the purposes of this specification such vitamins, vitamin precursors and colouring agents will be referred to as "diet supplementing agents".

In order to be efficiently ingested by a human or animal, the diet supplementing agent should be present in a water-soluble or water-dispersible form. Hitherto, this has been achieved by incorporating the diet supplementing agent in a composition, usually in particulate form, that is itself water-soluble or water-dispersible. U.S. Pat. Nos. 2,861,891, 3,110,598 and 3,206,316 disclose such water-dispersible preparations, particularly of carotenoids. The more efficient of these prior compositions have included emulsifiers, and the present invention is particularly concerned with this type of composition. Such edible compositions have been commercially available and widely used for a number of years, and the preparation and use of a typical edible composition of this type is described in U.S. Pat. No. 3,206,316.

Hitherto the emulsifier that has been most widely used in such edible compositions is "ascorbyl palmitate", i.e. an alkali-metal or ammonium salt of the palmitoyl ester of ascorbic acid.

The invention now provides an edible composition comprising a diet supplementing agent as defined above, and an acyl lactylate. It has been found that the use of an acyl lactylate as an emulsifier in this type of edible compositions gives a valuable increase in the efficiency of uptake by a human or animal of the diet supplementing agent.

Acyl lactylates are commercially available emulsifiers consisting essentially of compounds containing one acyl residue coupled with two lactic acid residues, which may be represented by the following approximate general formula: $RCO.O.CH(CH_3)CO.O.CH(CH_3)COOX$, where RCO is an acyl group and X is H or a metal atom. They are generally prepared by the reaction of a long chain aliphatic acid with lactic acid in a molar ratio of approximately 1:2, followed by neutralisation to an appropriate salt, e.g. the sodium salt or the calcium salt. Although the predominant component in a commercially available acyl lactylate is the reaction product containing one acyl residue coupled with two lactic acid residues, it will be appreciated that these commercially available emulsifiers will also contain minor amounts of other products of the reaction, and moreover that the acyl group itself will have been derived from an industrial fatty acid source, such as a natural fat or oil, and will therefore contain a blend of fatty acids with usually one particular carbon chain length predominating. Preferably the acyl group of the acyl lactylate should contain from 12 to 20, and ideally from 16 to 20, carbon atoms. A particularly preferred emulsifier for use in accordance with the invention is stearoyl lactylate. Normally this is available in the form of its sodium or calcium salt.

The weight ratio of the diet supplementing agent to the acyl lactylate can vary widely in an edible composition of the invention, and edible compositions of this type can be formulated anywhere in the range of weight ratios from 100:1 to 1:100. However, it is preferred that the weight ratio of diet supplementing agent to acyl lactylate should not be greater than 50:1. Preferably this weight ratio should not be less than 1:50. A particularly preferred weight ratio range is from 20:1 to 1:10. In the case of diet supplementing agents of the carotenoid type a particularly preferred weight ratio range is from 10:1 to 1:5.

The diet supplementing agent and the acyl lactylate can comprise the sole ingredients of the edible composition of the invention. Nevertheless, it will usually be desirable to incorporate one or more additional ingredients as carriers or diluents. Ingredients that are employed in commercially available edible compositions are edible gums such as gelatin, dextrin, gum arabic, gum tragacanth and pectin, sugars such as sucrose, and sugar derivatives such as saccharose esters. Other appropriate ingredients are disclosed in U.S. Pat. No. 3,206,316. Such additional ingredients may be used in the edible composition of the invention at any level up to say 99%, though in practice a level of 80% would not normally be exceeded.

Although the full advantages of the invention will be obtained if an acyl lactylate is used as the sole emulsifier in the edible composition, if desired one or more conventional emulsifying agents can be incorporated therein also.

Examples of diet supplementing agents to which the invention can be applied are vitamins such as vitamins A, D, E and K, and carotenoids such as canthaxanthin, astaxanthin, beta-carotene lycopene, bixin, zeaxanthin, cryptoxanthin, lutein, beta-apo-8'-carotenal, beta-apo-12'-carotenal, beta-apo-8'-carotenoic acid ethyl ester and esters of hydroxyl- or carboxyl-containing carotenoids.

The edible composition of the invention can be prepared by a process exactly analogous to that described in U.S. Pat. No. 3,206,316. The diet supplementing agent and the acyl lactylate can be dissolved in an appropriate organic solvent such as chloroform, carbon tetrachloride, methylene chloride, or benzene, which solution is then emulsified in water containing such additional ingredients as may be desired, and drying the emulsion and removing the solvent by evaporation to provide the edible composition in, for example, granulatable or particulate form.

The edible compositions of the invention can be fed to a human or animal separate from other components of the diet, or in admixture with other components of the diet. In one particular embodiment of the invention the diet supplementing agent is a carotenoid colouring agent and is used as a feedstuff additive for anadromous fish to pigment the flesh of such fish. In an alternative embodiment of the invention, wherein the diet supplementing agent is a colouring agent that is useful for enhancing the colour of a foodstuff in order to render the foodstuff more attractive, the edible composition can be used as an ingredient in the production of a distinct component of the diet. For example, certain yellow-coloured carotenoids can be used in this form to enhance the appreparance of human foodstuffs such as butter, and carotenoid pigments can be used in solution form with the acyl lactylate emulsifier in fruit juices, soft drinks and other liquid foodstuffs.

The application of the invention to the pigmentation of the flesh of salmon reared in captivity is illustrated in the following Example.

EXAMPLE

A number of edible compositions of the invention, containing canthaxanthin as the diet supplementing agent, sodium stearoyl lactylate, and gelatin were prepared by dissolving the canthaxanthin and the stearoyl lactylate in hot chloroform, emulsifying said solution in an aqueous solution of gelatin and freeze-drying the emulsion to give a brittle mass that was ground to a particle size suitable for inclusion in a fish diet.

The edible compositions contained different proportions of canthaxanthin and sodium stearoyl lactylate, as folows:

| Edible Composition | Weight ratio of canthaxanthin to sodium stearoyl lactylate |
| --- | --- |
| A | 1:2 |
| B | 2:1 |
| C | 5:1 |

These were added to the diet of different batches of salmon, and a commercially-available edible composition of analogous type comprising canthaxanthin and ascorbyl palmitate as the emulsifier, was used as a control.

Each edible composition was fed to the fish such that each fish consumed 50 ppm canthaxanthin expressed by weight of its diet. After a period of 11 weeks, the fish were killed and the average level of canthaxanthin in the flesh of each batch determined by chemical analysis. The following table gives the results obtained, after correcting for the trace amount of pigment present in the flesh of a second control batch of fish whose diet included no added canthaxanthin.

| Edible Composition | Level of canthaxanthin in flesh (ppm) |
| --- | --- |
| A | 1.0 |
| B | 0.8 |
| C | 1.4 |
| Commercially-available product | 0.1 |
| None | 0 |

This table indicates that each of the edible compositions of the invention gave rise to a considerably greater uptake of pigment in the flesh of the salmon consuming that composition instead of the commercially-available composition.

What is claimed is:

1. A process of rearing anadromous fish, wherein said fish are reared in captivity on a diet containing a food additive comprising:
   (a) An acyl lactylate consisting essentially of compounds having the formula:

RCO.O.CH(CH$_3$)CO.O.CH(CH$_3$)COOX wherein RCO is an acyl group containing 12 to 20 carbon atoms and X is H or a metal atom, and
   (b) a carotenoid pigment selected from the group consisting of canthaxanthin, astaxanthin and mixtures thereof, said acyl lactylate and said carotenoid pigment being present in a weight ratio of from 10:1 to 1:5, to impart pigmentation to the flesh of said fish.

2. A process according to claim 1, wherein said acyl group of said acyl lactylate contains from 16 to 20 carbon atoms.

3. A process according to claim 2, wherein said acyl lactylate is a stearoyl lactylate.

4. A process according to claim 3, wherein said stearoyl lactylate is sodium stearoyl lactylate or calcium stearoyl lactylate.

5. A process according to claim 1, wherein said food additive additionally comprises a carrier or diluent selected from the group consisting of edible gums, sugar or sugar derivatives, and mixtures thereof.

* * * * *